US008846196B2

(12) United States Patent
Moorlag et al.

(10) Patent No.: US 8,846,196 B2

(45) Date of Patent: Sep. 30, 2014

(54) FUSER MEMBER

(75) Inventors: Carolyn P. Moorlag, Mississauga (CA); Yu Qi, Oakville (CA); Qi Zhang, Mississauga (CA); Nan-Xing Hu, Oakville (CA); Kurt I. Halfyard, Missassauga (CA); Nicoleta D. Mihai, Oakville (CA); Gordon Sisler, St. Catharines (CA); Guiqin Song, Milton (CA); Edward G. Zwartz, Mississauga (CA); T. Brian McAneney, Burlington (CA)

(73) Assignee: Xerox Corporation, Norwalk, CT (US)

( * ) Notice: Subject to any disclaimer, the term of this patent is extended or adjusted under 35 U.S.C. 154(b) by 797 days.

(21) Appl. No.: 12/974,815

(22) Filed: Dec. 21, 2010

(65) Prior Publication Data

US 2012/0157277 A1 Jun. 21, 2012

(51) Int. Cl.

| | |
|---|---|
| ***B05D 5/08*** | (2006.01) |
| ***B32B 15/08*** | (2006.01) |
| ***B32B 25/20*** | (2006.01) |
| ***B32B 27/28*** | (2006.01) |
| ***G03G 15/20*** | (2006.01) |
| ***B05D 7/14*** | (2006.01) |
| *B05D 3/02* | (2006.01) |

(52) U.S. Cl.

CPC ............ *B05D 7/146* (2013.01); *B05D 2518/12* (2013.01); *B05D 3/0209* (2013.01); *B05D 5/083* (2013.01); *G03G 15/2057* (2013.01)

USPC ........... 428/339; 428/421; 428/422; 428/447; 428/448; 428/457; 399/333; 427/379; 427/387

(58) Field of Classification Search

None

See application file for complete search history.

(56) References Cited

U.S. PATENT DOCUMENTS

| | | | | |
|---|---|---|---|---|
| 3,542,830 | A | 11/1970 | Kim et al. | |
| 5,324,566 | A | 6/1994 | Ogawa et al. | |
| 5,456,987 | A | 10/1995 | Badesha | |
| 5,500,298 | A | 3/1996 | Badesha | |
| 5,500,299 | A | 3/1996 | Badesha | |
| 5,679,463 | A | 10/1997 | Visser et al. | |
| 5,686,189 | A | 11/1997 | Badesha et al. | |
| 5,716,700 | A * | 2/1998 | Kikukawa et al. | 428/339 |
| 5,720,704 | A | 2/1998 | Fukunaga et al. | |
| 7,767,758 | B2 | 8/2010 | Moorlag et al. | |
| 2010/0124661 | A1 | 5/2010 | Moorlag et al. | |
| 2010/0129123 | A1 * | 5/2010 | Natori et al. | 399/333 |

OTHER PUBLICATIONS

U.S. Appl. No. 12/974,836, Final Office Action dated Sep. 14, 2012.

U.S. Appl. No. 12/974,836, filed Dec. 21, 2010, Office Action dated Mar. 5, 2012.

Kwon et al., "Organic-inorganic hybrid materials for flexible optical waveguide applications", Journal of Materials Chemistry, 18, 579-585, 2008.

* cited by examiner

*Primary Examiner* — Ramsey Zacharia

(74) *Attorney, Agent, or Firm* — Hoffman Warnick LLC

(57) ABSTRACT

The present teachings provide a fuser member. The fuser member includes an outer layer comprising a composite of a fluoropolymer and a networked siloxyfluorocarbon polymer.

18 Claims, 5 Drawing Sheets

FUSER MEMBER

CROSS REFERENCE TO RELATED APPLICATIONS

This application relates to commonly assigned co-pending application Ser. No. 12/974,836, FUSER MEMBER AND COMPOSITION, filed simultaneously herewith and incorporated by reference in its entirety herein.

BACKGROUND

1. Field of Use

This disclosure is generally directed to fuser members useful in electrophotographic imaging apparatuses, including digital, image on image, and the like. In addition, the fuser member described herein can also be used in a transfix apparatus in a solid ink jet printing machine.

2. Background

In the electrophotographic printing process, a toner image can be fixed or fused upon a support (e.g., a paper sheet) using a fuser roller. Conventional fusing technologies apply release agents/fuser oils to the fuser roller during the fusing operation in order to maintain good release properties of the fuser roller. For example, oil fusing technologies have been used for all high speed products in the entry production and production color market.

While perfluoroalkoxy polymer resin (PFA) is currently used in many topcoat formulations in fuser rollers and belts to yield excellent release, issues such as surface cracking, denting, and delamination limit the lifetime of PFA rollers and belts. It would be desirable to find a material combination for fuser rollers and belts that mitigates surface cracking, denting and delamination while providing excellent release.

Ceramic materials are well-known for their strength and durability, and the incorporation of a ceramic-like material into a high-performance fluoroplastic, such as Teflon®, as a topcoat for fuser rollers and belts has been attempted with some success. Extending oil-less fusing technologies to high speed printers, such as 100 pages per minute (ppm) or faster, while meeting a series of stringent system requirements, such as image quality, parts cost, reliability, long component life, etc., remains technically challenging.

In addition, in oil-less fusing, waxy toner is often used to aid release of the toner image. However, wax can be transferred to the fuser surface (e.g., polytetrafluoroethylene (PTFE) or Teflon®) and thus contaminate the fuser surface when using the conventional PTFE surface. For example, one frequently mentioned failure mode for PTFE oil-less fuser is called wax ghosting. The wax on the PTFE affects the image quality of the next print. It would be desirable to have a material combination that prevents this problem.

SUMMARY

According to an embodiment, a fuser member is provided. The fuser member comprises an outer layer comprising a composite of a fluoropolymer and a networked siloxyfluorocarbon polymer.

According to another embodiment, there is provided a method for producing a fuser member. The method comprises coating a dispersion of siloxane terminated fluorocarbons, fluoropolymer particles, and a solvent on a surface of a fuser member. The dispersion is heated to a temperature above the melting temperature of the fluoropolymer to form an outer layer of a fluoropolymer and a networked siloxyfluorocarbon polymer.

According to another embodiment there is provided a fuser member. The fuser member comprises a substrate, a resilient layer disposed on the substrate and an outer layer disposed on the resilient layer. The outer layer comprises a composite of a fluoropolymer of polytetrafluoroethylene and perfluoroalkoxy polymer resin and a networked siloxyfluorocarbon polymer.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

Figure 1:
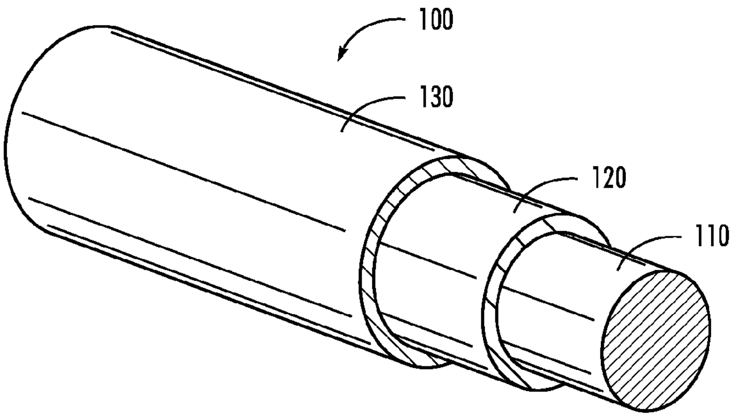
FIG. 1 depicts an exemplary fusing member having a cylindrical substrate in accordance with the present teachings.

It should be noted that some details of the FIGS. have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Illustrations with respect to one or more implementations, alterations and/or modifications can be made to the illustrated examples without departing from the spirit and scope of the appended claims. In addition, while a particular feature may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Notwithstanding that the numerical ranges and parameters setting forth the broad scope of embodiments are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

The fixing member can include a substrate having one or more functional layers formed thereon. The substrate can include, e.g., a cylinder or a belt. The one or more functional layers includes an outermost or surface layer comprising a fluorpolymer in a networked siloxyfluorcarbon having a surface wettability that is hydrophobic and/or oleophobic. Such fixing member can be used as an oil-less fusing member for high speed, high quality electrophotographic printing to ensure and maintain a good toner release from the fused toner image on an image supporting material (e.g., a paper sheet), and further assist paper stripping.

In various embodiments, the fixing member can include, for example, a substrate, with one or more functional layers formed thereon. The substrate can be formed in various shapes, e.g., a cylinder (e.g., a cylinder tube), a cylindrical drum, a belt, a drelt (a cross between a drum and a belt), or a film, using suitable materials that are non-conductive or conductive depending on a specific configuration, for example, as shown in FIGS. 1 and 2.

Figure 2:
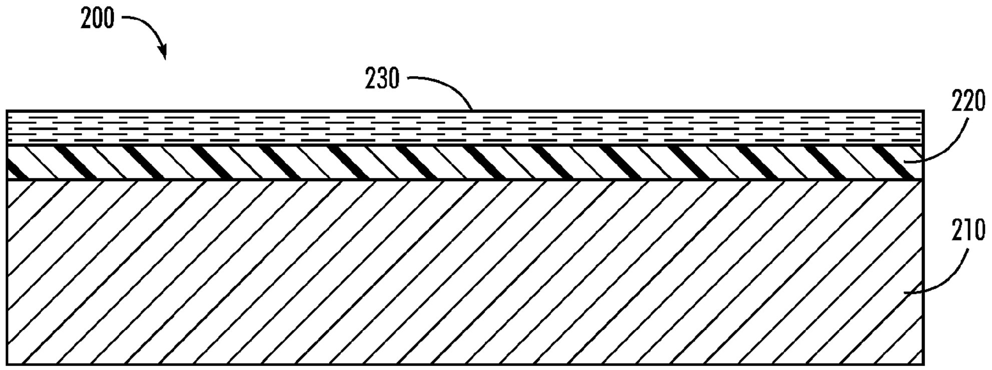
FIG. 2 depicts an exemplary fusing member having a belt substrate in accordance with the present teachings.

Specifically, FIG. 1 depicts an exemplary embodiment of a fixing or fusing member 100 having a cylindrical substrate 110 and FIG. 2 depicts another exemplary fixing or fusing member 200 having a belt substrate 210 in accordance with the present teachings. It should be readily apparent to one of ordinary skill in the art that the fixing or fusing member 100 depicted in FIG. 1 and the fixing or fusing member 200 depicted in FIG. 2 represent generalized schematic illustrations and that other layers/substrates can be added or existing layers/substrates can be removed or modified.

In FIG. 1 the exemplary fixing member 100 can be a fuser roller having a cylindrical substrate 110 with one or more functional layers 120 and an outer layer 130 formed thereon. The outer layer 130 comprises a fluoropolymer dispersed in a networked siloxyfluorocarbon polymer. The outer layer has a thickness of from about 5 microns to about 250 microns, or from about 10 microns to about 150 microns, or from about 15 microns to about 50 microns. In various embodiments, the cylindrical substrate 110 can take the form of a cylindrical tube, e.g., having a hollow structure including a heating lamp therein, or a solid cylindrical shaft. In FIG. 2, the exemplary fixing member 200 can include a belt substrate 210 with one or more functional layers, e.g., 220 and an outer surface 230 formed thereon. The outer surface 230 or layer comprises a fluoropolymer dispersed in a networked siloxyfluorocarbon polymer. The outer layer has a thickness of from about 5 microns to about 250 microns, or from about 10 microns to about 150 microns, or from about 15 microns to about 50 microns. The belt substrate 210 and the cylindrical substrate 110 can be formed from, for example, polymeric materials (e.g., polyimide, polyaramide, polyether ether ketone, polyetherimide, polyphthalamide, polyamide-imide, polyketone, polyphenylene sulfide, fluoropolyimides or fluoropolyurethanes), metal materials (e.g., aluminum or stainless steel) to maintain rigidity and structural integrity as known to one of ordinary skill in the art.

Examples of functional layers 120 and 220 include fluorosilicones, silicone rubbers such as room temperature vulcanization (RTV) silicone rubbers, high temperature vulcanization (HTV) silicone rubbers, and low temperature vulcanization (LTV) silicone rubbers. These rubbers are known and readily available commercially, such as SILASTIC® 735 black RTV and SILASTIC® 732 RTV, both from Dow Corning; 106 RTV Silicone Rubber and 90 RTV Silicone Rubber, both from General Electric; and JCR6115CLEAR HTV and SE4705U HTV silicone rubbers from Dow Corning Toray Silicones. Other suitable silicone materials include the siloxanes (such as polydimethylsiloxanes); fluorosilicones such as Silicone Rubber 552, available from Sampson Coatings, Richmond, Va.; liquid silicone rubbers such as vinyl crosslinked heat curable rubbers or silanol room temperature crosslinked materials; and the like. Another specific example is Dow Corning Sylgard 182. Commercially available LSR rubbers include Dow Corning Q3-6395, Q3-6396, SILASTIC® 590 LSR, SILASTIC® 591 LSR, SILASTIC® 595 LSR, SILASTIC® 596 LSR, and SILASTIC® 598 LSR from Dow Corning. The functional layers provide elasticity and can be mixed with inorganic particles, for example SiC or $Al_2O_3$, as required.

Examples of functional layers 120 and 220 also include fluoroelastomers. Fluoroelastomers are from the class of 1) copolymers of two of vinylidenefluoride, hexafluoropropylene, and tetrafluoroethylene; 2) terpolymers of vinylidenefluoride, hexafluoropropylene, and tetrafluoroethylene; and 3) tetrapolymers of vinylidenefluoride, hexafluoropropylene, tetrafluoroethylene, and cure site monomer. These fluoroelastomers are known commercially under various designations such as VITON A®, VITON B®, VITON E®, VITON E 60C®, VITON E430®, VITON 910®, VITON GH®; VITON GF®; and VITON ETP®. The VITON® designation is a Trademark of E.I. DuPont de Nemours, Inc. The cure site monomer can be 4-bromoperfluorobutene-1,1,1-dihydro-4-bromoperfluorobutene-1,3-bromoperfluoropropene-1,1,1-dihydro-3-bromoperfluoropropene-1, or any other suitable, known cure site monomer, such as those commercially available from DuPont. Other commercially available fluoropolymers include FLUOREL 2170®, FLUOREL 2174®, FLUOREL 2176®, FLUOREL 2177® and FLUOREL LVS 76®, FLUOREL® being a registered trademark of 3M Company. Additional commercially available materials include AFLAS™ a poly(propylene-tetrafluoroethylene) and FLUOREL II® (LII900) a poly(propylene-tetrafluoroethylenevinylidenefluoride) both also available from 3M Company, as well as the Tecnoflons identified as FOR-60KIR®, FOR-LHF® NM® FOR-THF®, FOR-TFS®, TH®, NH®, P757®, TNS®, T439®, PL958®, BR9151® and TN505® available from Ausimont.

Examples of three known fluoroelastomers are (1) a class of copolymers of two of vinylidenefluoride, hexafluoropropylene, and tetrafluoroethylene, such as those known commercially as VITON A®; (2) a class of terpolymers of vinylidenefluoride, hexafluoropropylene, and tetrafluoroethylene known commercially as VITON B®; and (3) a class of tetrapolymers of vinylidenefluoride, hexafluoropropylene, tetrafluoroethylene, and cure site monomer known commercially as VITON GH® or VITON GF®.

The fluoroelastomers VITON GH® and VITON GF® have relatively low amounts of vinylidenefluoride. The VITON GF® and VITON GH® have about 35 weight percent of vinylidenefluoride, about 34 weight percent of hexafluoropropylene, and about 29 weight percent of tetrafluoroethylene, with about 2 weight percent cure site monomer.

For a roller configuration, the thickness of the functional layer can be from about 0.5 mm to about 10 mm, or from about 1 mm to about 8 mm, or from about 2 mm to about 7 mm. For a belt configuration, the functional layer can be from about 25 microns up to about 2 mm, or from 40 microns to about 1.5 mm, or from 50 microns to about 1 mm.

Optionally, any known and available suitable adhesive layer may be positioned between the outer surface layer, the functional layer and the substrate. Examples of suitable adhesives include silanes such as amino silanes (such as, for example, HV Primer 10 from Dow Corning), titanates, zirconates, aluminates, and the like, and mixtures thereof. In an embodiment, an adhesive in from about 0.001 percent to about 10 percent solution can be wiped on the substrate. The adhesive layer can be coated on the substrate, or on the outer layer, to a thickness of from about 2 nanometers to about 2,000 nanometers, or from about 2 nanometers to about 500 nanometers. The adhesive can be coated by any suitable known technique, including spray coating or wiping.

Figure 3A:
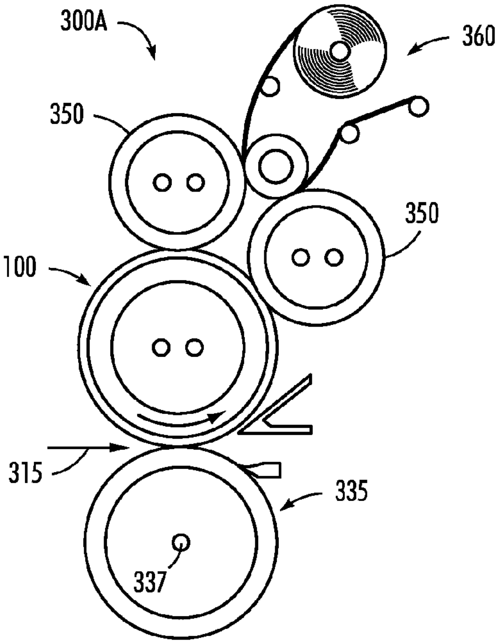
FIGS. 3A-3B depict exemplary fusing configurations using the fuser rollers shown in FIG. 1 in accordance with the present teachings.
Figure 3B:
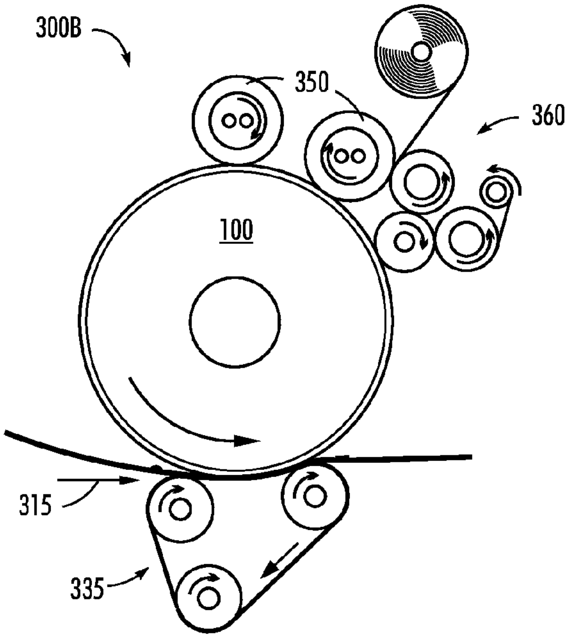
Figure 4A:
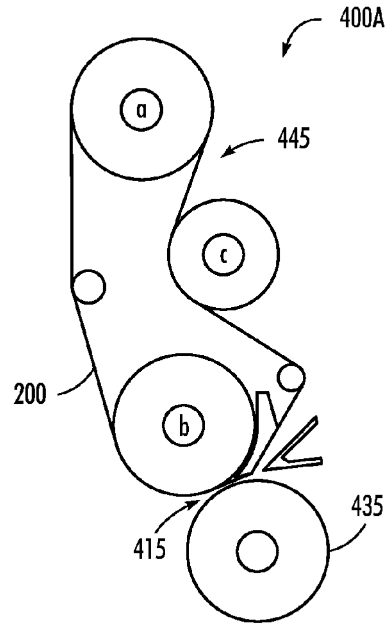
FIGS. 4A-4B depict other exemplary fusing configurations using the fuser belt shown in FIG. 2 in accordance with the present teachings.
Figure 4B:
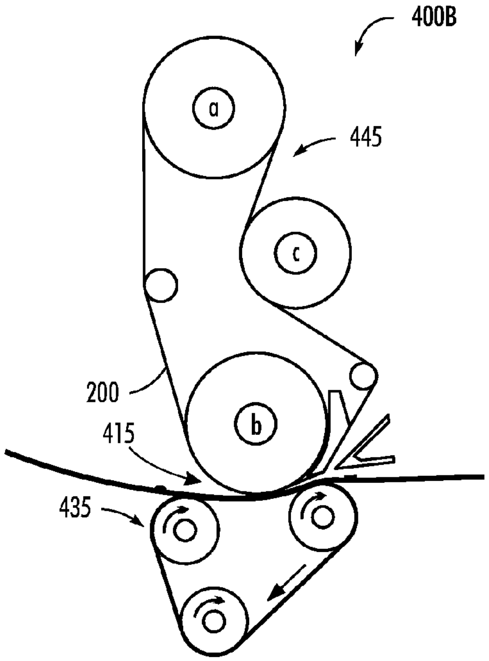

FIGS. 3A-4B and FIGS. 4A-4B depict exemplary fusing configurations for the fusing process in accordance with the present teachings. It should be readily apparent to one of ordinary skill in the art that the fusing configurations 300A-B depicted in FIGS. 3A-3B and the fusing configurations 400A-B depicted in FIGS. 4A-4B represent generalized schematic illustrations and that other members/layers/substrates/configurations can be added or existing members/layers/substrates/configurations can be removed or modified. Although an electrophotographic printer is described herein, the disclosed apparatus and method can be applied to other printing technologies. Examples include offset printing and inkjet and solid transfix machines.

FIGS. 3A-3B depict the fusing configurations 300A-B using a fuser roller shown in FIG. 1 in accordance with the present teachings. The configurations 300A-B can include a fuser roller 100 (i.e., 100 of FIG. 1) that forms a fuser nip with a pressure applying mechanism 335, such as a pressure roller in FIG. 3A or a pressure belt in FIG. 3B, for an image supporting material 315. In various embodiments, the pressure applying mechanism 335 can be used in combination with a heat lamp 337 to provide both the pressure and heat for the fusing process of the toner particles on the image supporting material 315. In addition, the configurations 300A-B can include one or more external heat roller 350 along with, e.g., a cleaning web 360, as shown in FIG. 3A and FIG. 3B.

FIGS. 4A-4B depict fusing configurations 400A-B using a fuser belt shown in FIG. 2 in accordance with the present teachings. The configurations 400A-B can include a fuser belt 200 (i.e., 200 of FIG. 2) that forms a fuser nip with a pressure applying mechanism 435, such as a pressure roller in FIG. 4A or a pressure belt in FIG. 4B, for a media substrate 415. In various embodiments, the pressure applying mechanism 435 can be used in a combination with a heat lamp to provide both the pressure and heat for the fusing process of the toner particles on the media substrate 415. In addition, the configurations 400A-B can include a mechanical system 445 to move the fuser belt 200 and thus fuse the toner particles and forming images on the media substrate 415. The mechanical system 445 can include one or more rollers 445*a-c*, which can also be used as heat rollers when needed.

Figure 5:
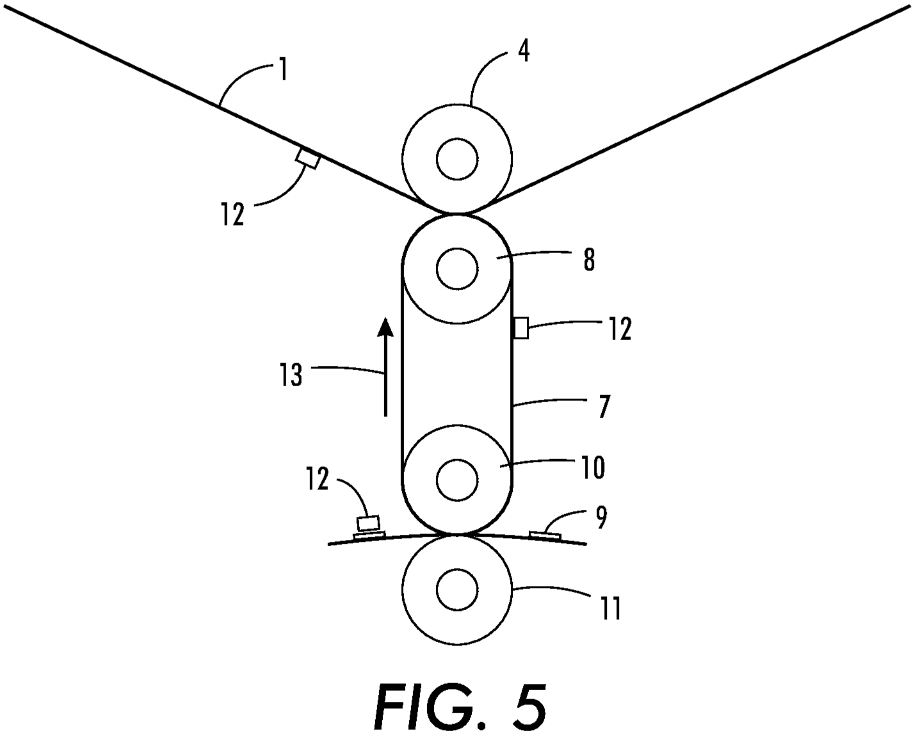
FIG. 5 depicts an exemplary fuser configuration using a transfix apparatus.

FIG. 5 demonstrates a view of an embodiment of a transfix member 7 which may be in the form of a belt, sheet, film, or like form. The transfix member 7 is constructed similarly to the fuser belt 200 described above. The developed image 12 positioned on intermediate transfer member 1 is brought into contact with and transferred to transfix member 7 via rollers 4 and 8. Roller 4 and/or roller 8 may or may not have heat associated therewith. Transfix member 7 proceeds in the direction of arrow 13. The developed image is transferred and fused to a copy substrate 9 as copy substrate 9 is advanced between rollers 10 and 11. Rollers 10 and/or 11 may or may not have heat associated therewith.

In the embodiments described herein, a fluoropolymer such as PFA or another fluoroplastic with superior release is combined with a siloxyfluorocarbon (SFC) material for the purpose of preparing high-performance fusing topcoats or fusing surface layers 130 or 230 as depicted in FIGS. 1 and 2 respectively. The composite combines a high performance fluorocarbon processed by sol-gel synthesis in order to mitigate these materials issues and yield topcoats with excellent release, robustness, and adherence to the substrate for long-lifetime applications. The material also enables ease of processing due to self-adhesion to a silicone substrate; removing the need for a primer layer.

Ceramic materials are well-known for their strength and durability, and the incorporation of a ceramic-like material into a high-performance fluoroplastic topcoat such as Teflon is expected to improve robustness of the material. Sol-gel processing of siloxyfluorocarbon (SFC) precursors—composed of siloxane-terminated fluorocarbon chains are shown in Scheme 1. A siloxy-crosslinked network is prepared. SFC precursors are designed to incorporate fluorinated chains that add flexibility and low-surface energy character to the resulting material. A variety of SFC precursors with varying siloxane and fluorocarbon components may be used to prepare composite coatings, including di- and tri-alkoxy silanes, linear and branched fluoroalkanes, and fluoroarenes.

Scheme 1: SFC precursors used to prepare networked SFC coatings

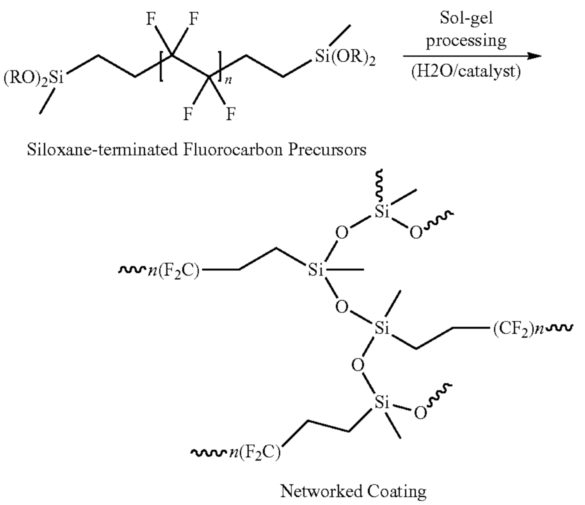

The SFC precursors are processed via sol-gel processing in hydrocarbon solvents such as ethanol or isopropanol, where the solvent system includes the addition of a small portion of water, such as from about 1 molar equivalent to 10 molar equivalents of water compared to siloxyfluorocarbon precursors or the siloxane terminated fluorocarbons, or from about 2 molar equivalents to about 4 molar equivalents of water. Upon the addition of water to the solution of sol gel precursors, alkoxy groups react with water, and condense to form agglomerates that are partially networked, and are referred to as a sol. Upon coating of the partially networked sol onto a substrate, a gel is formed upon drying, and with subsequent heat treatment (typically to about 200° C.), the fully networked SFC coating (siloxyfluorocarbon networked polymer) is formed on the substrate surface (fuser substrate). Fluorocarbon chain length n is in a range between about 1 and about 20, or about 2 to about 5, or about 3 to about 4.

A composite of SFC and a fluoropolymer is produced from the combination of a solution of SFC and fluoropolymer particles, followed by sol-gel processing to produce a networked composite material. A schematic showing a SFC-fluoropolymer is shown in Scheme 2. Following heat treatment and melting of fluoropolymer particles, the SFC network reinforces bulk fluoropolymer to enable mechanical robustness.

Scheme 2: Simple schematic of composite system of fluoropolymer particles and networked SFC material, before and after heat treatment at the melting temperature of fluoropolymer particles. The weight ratio of the fluoropolymer to the networked siloxyfluorocarbon is from about 99:1 to about 50:50, or from about 90:10 to about 70:30, or from about 85:15 to about 75:25.

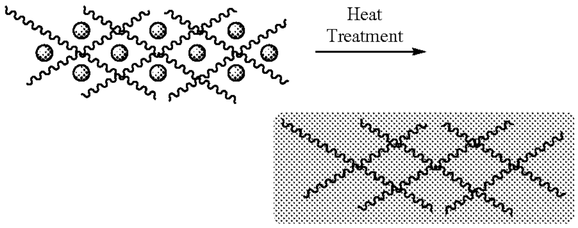

Fluoropolymer particles suitable for use in the formulation described herein include fluorine-containing polymers. These polymers include fluoropolymers comprising a monomeric repeat unit that is selected from the group consisting of vinylidene fluoride, hexafluoropropylene, tetrafluoroethylene, perfluoroalkylvinylether, and mixtures thereof. The fluoropolymers may include linear or branched polymers, and cross-linked fluoroelastomers. Examples of fluoropolymer include polytetrafluoroethylene (PTFE); perfluoroalkoxy polymer resin (PFA); copolymer of tetrafluoroethylene (TFE) and hexafluoropropylene (HFP); copolymers of hexafluoropropylene (HFP) and vinylidene fluoride (VDF or VF2); terpolymers of tetrafluoroethylene (TFE), vinylidene fluoride (VDF), and hexafluoropropylene (HFP); and tetrapolymers of tetrafluoroethylene (TFE), vinylidene fluoride (VF2), and hexafluoropropylene (HFP), and mixtures thereof. The fluoropolymer particles provide chemical and thermal stability and have a low surface energy. The fluoropolymer particles have a melting temperature of from about 200° C. to about 400° C., or from about 255° C. to about 360° C. or from about 280° C. to about 330° C.

Crack-free coatings may be characterized by a smooth surface where cracks or defects on a typically millimeter scale or micron scale are not observed. In instances where a very homogeneous surface is required, crack-free coatings may also be characterized by a smooth surface where cracks or defects on a nanometer scale are not observed. Fluoropolymer such as PFA applied as a layer on silicone functional layer may crack due to gas or solvent release from silicone up though the topcoat layer, resulting in defects on the PFA surface forming during heat treatment and melting. The formation of a SFC network surrounding PFA fluoropolymer particles provides a robust framework that strengthens the coating and limits cracking of the release layer during processing of coatings on silicone functional layer.

A crack-free surface will extend the fuser member life due to the mitigation of contamination that occurs due to toner trapping in small cracks or defects on the release layer surface. A crack-containing surface can also result in inability to use the fuser member due to defects showing on the image of the printed surface. A materials system that reliably enables the formation of a crack-free release layer surface is advantageous in the production of a fuser member.

The thermally treated SFC and fluoropolymer composite release layer is more robust to surface damage compared with a fluoropolymer release layer that does not contain SFC. The surface is less prone to scratch when a tip of a harder material than the surface layer is dragged across the release layer surface. The surface is less prone to denting or compression defects arising from a force applied downward from the surface. Damage of this type is common for fuser members during regular handling and use, and such damage limits the usable life of fuser members. It is advantageous to develop a release layer surface that is resilient to denting or compression defects to extend fuser member lifetime.

The thermally treated SFC and fluoropolymer composite release layer is capable of improved adhesion to the functional layer (silicone or otherwise), owing to the incorporation of SFC into the composite layer. The presence of siloxy functionalities in the SFC component results in direct reaction or strong interaction or both to the layer under the release layer. Adhesion may be to a primer layer that is adhered to the functional layer, or directly to the functional layer. In one embodiment, the SFC and fluoropolymer composite release layer is directly bonded to the functional layer without the requirement of a primer layer. A measure of the adhesion of the release layer is the pulling by force of the layer from the undercoat, where if the layer is pulled cleanly from the undercoat without the attachment of the undercoat, then the adhesion is poor. Increased attachment of the undercoat, or inability to pull the release layer away indicates increased adhesion. SFC and fluoropolymer composite release layers display increased adhesion to primer layers or functional layers when compared with a fluoropolymer release layer containing no SFC. Adhesion is dependent on the proportion of SFC contained in the composite, and is generally increased with increase in the proportion of SFC incorporated.

Additives and additional conductive or non-conductive fillers may be present in the above-described composition of fluoropolymer particles and networked SFC material. In various embodiments, other filler materials or additives including, for example, inorganic particles, can be used for the coating composition and the subsequently formed surface layer. Conductive fillers used herein include carbon blacks such as carbon black, graphite, fullerene, acetylene black, fluorinated carbon black, and the like; carbon nanotubes; metal oxides and doped metal oxides, such as tin oxide, antimony dioxide, antimony-doped tin oxide, titanium dioxide, indium oxide, zinc oxide, indium oxide, indium-doped tin trioxide, and the like; and mixtures thereof. Certain polymers such as polyanilines, polythiophenes, polyacetylene, poly(p-phenylene vinylene), poly(p-phenylene sulfide), pyrroles, polyindole, polypyrene, polycarbazole, polyazulene, polyazepine, poly(fluorine), polynaphthalene, salts of organic sulfonic acid, esters of phosphoric acid, esters of fatty acids, ammonium or phosphonium salts and mixtures thereof can be used as conductive fillers. In various embodiments, other additives known to one of ordinary skill in the art can also be included to form the disclosed composite materials.

Fillers may be added from about 0 weight percent to about 10 weight percent, or from about 0 weight percent to about 5 weight percent, or from about 1 weight percent to about 3 weight percent.

The disclosed outer surface can be used in oil-less fusing processes to assist toner release and paper stripping, as well as to improve toner design.

Such oil-less fusing can provide many more advantages. For example, the elimination of the entire oil delivering system in a fuser system can provide lower manufacture cost, lower operating cost (e.g., due to no oil-replenishment), simpler subsystem design and lighter weight. In addition, an oil-free fusing process/operation can overcome, e.g., non-uniform oiling of the fuser that generates print streaks and unacceptable image quality defects, and some machine reliability issues (e.g., frequent breakdown) that generates high service cost and customer dissatisfaction.

A solution of SFC and fluoropolymer particles is coated on a substrate in any suitable known manner. Typical techniques for coating such materials on the substrate layer include flow coating, liquid spray coating, dip coating, wire wound rod coating, fluidized bed coating, powder coating, electrostatic spraying, sonic spraying, blade coating, molding, laminating, and the like. After the solution is coated there is sol-gel processing to produce a networked composite material. The processed coating is heated to cure the networked coating and melt the fluoropolymer particles.

The SFC and fluoropolymer composite coating may be heat treated in a two step process, whereby the coating is first heat treated to a temperature of between about 100° C. to about 250° C. for a time of between about 2 and about 20 hours. Heat treatment may also be carried out stepwise by progressively ramping the temperature to higher temperatures over time until the final temperature is reached. The first step in the heat treatment fully networks the SFC polymer and fixes the coating and the fluoropolymer particles to form a layer resistant to wiping or brushing. The second step of the heat treatment is the high temperature heat treatment of from about 200° C. to about 400° C., or from about 255° C. to about 360° C. or from about 280° C. to about 330° C. for a time of between about 5 minutes to about 30 minutes, or form about 7 minutes to about 20 minutes, or from about 10 minutes to about 15 minutes. The second step in the heat treatment melts the fluoropolymer particles to form a release layer suitable for fusing applications.

The SFC and fluoropolymer composite coating may be heat treated in a single step process, whereby the coating is directly heat treated from about 200° C. to about 400° C., or from about 255° C. to about 360° C. or from about 280° C. to about 330° C. for a time of between about 5 minutes to about 30 minutes, or from about 7 minutes to about 20 minutes, or from about 10 minutes to about 15 minutes.

Specific embodiments will now be described in detail. These examples are intended to be illustrative, and not limited to the materials, conditions, or process parameters set forth in these embodiments. All parts are percentages by solid weight unless otherwise indicated.

EXAMPLES

Test coatings were prepared on Olympia roller segments containing varying levels of the SFC precursor disiloxyperfluorohexane in ethanol as shown in structure 1

Structure 1

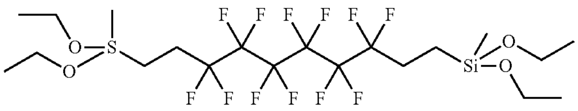

were combined with dispersed PFA (M-320 PFA powder (particle size>15 μm)) in ethanol. The dispersion was applied by spray coating directly to a bare silicone surface. After an initial heat treatment to 218° C. to fully crosslink and fix the SFC, a high temperature treatment at 350° C. for 10 minutes was carried out to melt PFA. Under a microscope, at 75 and 50 weight percent loadings of PFA in SFC, a rough-morphology surface with distinct particles present was converted to a coalesced surface. Surface morphology was homogeneous, and crack-free in all cases.

A 25 weight percent SFC and 75 weight percent PFA dispersion in ethanol was spray-coated onto a bare Olympia roller and tested for toner release and fusing latitude. Results are shown in Table 1. While the SFC material used displays a narrower fusing latitude and lower hot-offset temperature compared to PFA, the composite SFC/PFA roller shows a fusing latitude almost as wide as for the PFA control. The material displays more robustness than PFA; when scraped with a spatula, denting and wounding often occurring with PFA was not observed. Qualitatively, the composite material is firmer than PFA, yet remains flexible.

TABLE 1

| Metric | DC700 roll (PFA) | SFC Only | 25/75 SFC/PFA |
|---|---|---|---|
| Coating | Sleeve | Spray | Spray |
| Cold offset | 130° C. | 120° C. | 125° C. |
| Gloss 40 | 140° C. | 145° C. | 146° C. |
| Peak Gloss | 73 ggu | 60 ggu | 55 ggu |
| Gloss Mottle | 209° C. | 160° C. | 204° C. |
| Hot Offset | >210° C. | 165° C. | 204° C. |
| Fusing Latitude (HO-CO) | >80° C. | 45° C. | 79° C. |

It was noted that without the use of a primer layer, the topcoat containing only 25 weight percent SFC material adhered well to the silicone surface, and did not delaminate during fusing. At this high of a PFA content (75 weight percent), the composite coating could be peeled away with force, which is comparable to a PFA sleeve adhered with a primer layer. The composite coating of fluoropolymer and SFC eliminates the need for a primer or adhesive layer.

Figure 6:
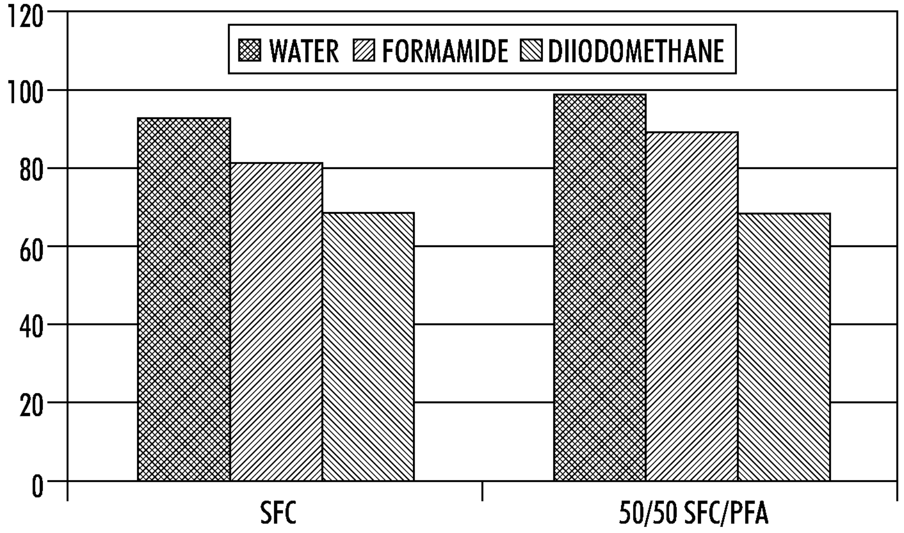
FIG. 6 shows contact angles for various liquids for fuser members.

A 50 weight percent SFC/50 weight percent PFA dispersion was flow coated with multiple passes onto a bare silicone Olympia roller and heat-treated to form a firm outer layer. Compared with a PFA topcoat, the surface is very robust to wounding or denting. The composite strongly binds to the silicone substrate and cannot be rubbed or peeled away from the silicone substrate by force. Contact angles of water, formamide, and diiodomethane of the flow-coated material on the roller were tested, and were higher than for SFC (FIG. 6). The results indicate that surface energy of composites are intermediate between that of PFA and SFC ( ), as would be expected.

In summary, scoping studies of SFC/fluoropolymer composite coatings have been carried out by both spray coating and flow coating processing techniques, and result in crack-free surface coatings, excellent toner release, excellent abrasion resistance, and excellent adherence to silicone.

It will be appreciated that variants of the above-disclosed and other features and functions or alternatives thereof may be combined into other different systems or applications. Various presently unforeseen or unanticipated alternatives, modifications, variations, or improvements therein may be subsequently made by those skilled in the art, which are also encompassed by the following claims.

What is claimed is:

1. A fuser member comprising:

an outer layer comprising a composite of a fluoropolymer and a networked siloxyfluorocarbon polymer, wherein the networked siloxyfluorocarbon polymer comprises the structure:

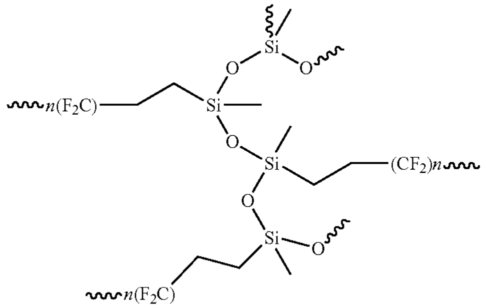

wherein n is from about 1 to about 20.

2. The fuser member of claim 1, wherein the fluoropolymer is selected from the group consisting of polytetrafluoroethylene (PTFE); perfluoroalkoxy polymer resin (PFA); copolymer of tetrafluoroethylene (TFE) and hexafluoropropylene (HFP); copolymers of hexafluoropropylene (HFP) and vinylidene fluoride (VDF or VF2); terpolymers of tetrafluoroethylene (TFE), vinylidene fluoride (VDF), and hexafluoropropylene (HFP); and tetrapolymers of tetrafluoroethylene (TFE), vinylidene fluoride (VF2), hexafluoropropylene (HFP) and a cure site monomer.

3. The fuser member of claim 1 further comprising:

a substrate; and a resilient layer disposed on the substrate wherein the outer layer is disposed on the resilient layer.

4. The fuser member of claim 3, wherein the resilient layer comprises a silicone material.

5. The fuser member of claim 1, wherein the substrate comprises a metal.

6. The fuser member of claim 1, wherein the outer layer further comprises filler materials selected from the group consisting carbon black, graphite, fullerene, acetylene black, fluorinated carbon black, carbon nanotubes, metal oxides, doped metal oxides, polyanilines, polythiophenes, polyacetylene, poly(p-phenylene vinylene), poly(p-phenylene sulfide), pyrroles, polyindole, polypyrene, polycarbazole, polyazulene, polyazepine, poly(fluorine), polynaphthalene, salts of organic sulfonic acid, esters of phosphoric acid, esters of fatty acids, ammonium or phosphonium salts and mixture thereof.

7. The fuser member of claim 6, wherein the filler materials is up to about 10 weight percent of the outer layer.

8. The fuser member of claim 1, wherein the outer layer comprises a thickness of from about 10 microns to about 250 microns.

9. A method for producing a fuser member comprising:

coating a dispersion of di- and tri-alkoxy siloxane terminated fluorocarbons, fluoropolymer particles, and a solvent on a resilient surface of a fuser member; and heating the dispersion above the melting temperature of the fluoropolymer particles to form a networked siloxyfluorocarbon having a structure:

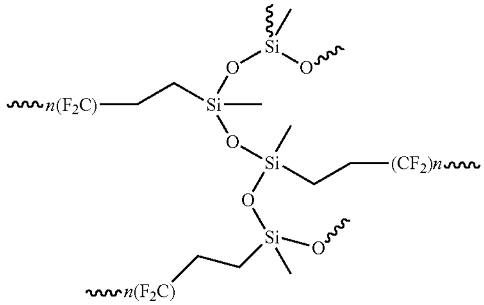

wherein n is from about 1 to about 20.

10. The method of claim 9, wherein the fluoropolymer particles are selected from the group consisting of polytetrafluoroethylene (PTFE); perfluoroalkoxy polymer resin (PFA); copolymer of tetrafluoroethylene (TFE) and hexafluoropropylene (HFP); copolymers of hexafluoropropylene (HFP) and vinylidene fluoride (VDF or VF2); terpolymers of tetrafluoroethylene (TFE), vinylidene fluoride (VDF), and hexafluoropropylene (HFP); and tetrapolymers of tetrafluoroethylene (TFE), vinylidene fluoride (VF2), hexafluoropropylene (HFP) and a cure site monomer.

11. The method of claim 9, wherein the curing comprises;

heating the fuser member to a first temperature ranges from about 100° C. to about 250° C. for a time of from about 2 hours to about 20 hours; and heating the fuser member to a second temperature ranges from about 200° C. to about 400° C. for a time of from about 5 minutes to about 30 minutes wherein the fluoropolymer particles are melted.

12. The method of claim 9, wherein the step of coating the dispersion comprises an application technique selected from the group consisting of spray coating, painting, dip coating, brush coating, roller coating, spin coating, casting, and flow coating.

13. The method of claim 9 wherein the solvent is selected from the group consisting of alcohols, ketones, water and mixtures thereof.

14. The polymer of claim 13 wherein an amount of water is from about 1 to 10 molar equivalents of water to the siloxane terminated fluorocarbons.

15. A fuser member comprising:

a substrate;

a resilient layer disposed on the substrate; and an outer layer comprising a composite of a fluoropolymer selected from the group consisting of polytetrafluoroethylene and perfluoroalkoxy polymer resin, and a networked siloxyfluorocarbon polymer, wherein the networked siloxyfluorocarbon polymer comprises the structure:

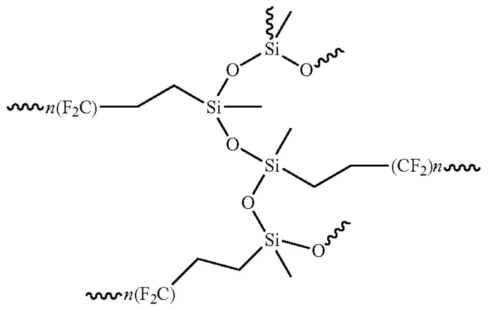
wherein n is from about 1 to about 20.
16. The fuser member of claim 15 wherein the fluoropolymer to siloxyfluorocarbon polymer weight ratio in the outer layer is from about 99:1 to about 50:50.
17. The fuser member of claim 15 comprising a roller.
18. The fuser member of claim 15 comprising a belt.
* * * * *